United States Patent
Desai

(10) Patent No.: US 7,142,813 B1
(45) Date of Patent: Nov. 28, 2006

(54) SHORT RANGE WIRELESS DEVICE INTERFACE WITH PARASITIC POWER SUPPLY

(75) Inventor: Manish J. Desai, Houston, TX (US)

(73) Assignee: Commerciant, L.P., Houston, TX (US)

( * ) Notice: Subject to any disclaimer, the term of this patent is extended or adjusted under 35 U.S.C. 154(b) by 522 days.

(21) Appl. No.: 10/177,774

(22) Filed: Jun. 21, 2002

(51) Int. Cl.
*H04B 7/00* (2006.01)

(52) U.S. Cl. ............... 455/41.2; 455/414.1; 455/414.4; 455/420; 455/15

(58) Field of Classification Search ............... 455/41.2, 455/414.1, 414.4, 420, 15
See application file for complete search history.

(56) References Cited

U.S. PATENT DOCUMENTS

| | | | | |
|---|---|---|---|---|
| 5,070,500 A | * | 12/1991 | Horinouchi et al. | ... 365/189.02 |
| 5,402,523 A | * | 3/1995 | Berg | ............... 455/450 |
| 5,608,605 A | * | 3/1997 | Siow et al. | ............... 361/684 |
| 6,571,103 B1 | * | 5/2003 | Novakov | ............... 455/464 |
| 6,678,516 B1 | * | 1/2004 | Nordman et al. | ........ 455/414.1 |
| 6,785,542 B1 | * | 8/2004 | Blight et al. | ............. 455/426.1 |
| 6,795,688 B1 | * | 9/2004 | Plasson et al. | ............. 455/41.2 |
| 6,801,777 B1 | * | 10/2004 | Rusch | ............. 455/452.2 |
| 6,879,807 B1 | * | 4/2005 | Fox et al. | ............. 455/11.1 |
| 2002/0022453 A1 | * | 2/2002 | Balog et al. | .............. 455/41 |
| 2002/0164953 A1 | * | 11/2002 | Curtis | ............. 455/41 |
| 2004/0157559 A1 | * | 8/2004 | Sugikawa | ............. 455/41.2 |

FOREIGN PATENT DOCUMENTS

KR 2001026356 A * 4/2001

OTHER PUBLICATIONS

U.S. Appl. No. 09/588,367, Desai et al.
U.S. Appl. No. 09/588,453, Husain et al.

* cited by examiner

*Primary Examiner*—Matthew Anderson
*Assistant Examiner*—Minh Dao
(74) *Attorney, Agent, or Firm*—Fulbright & Jaworski LLP

(57) ABSTRACT

A short range wireless protocol is established to/from a processing device, such as a point of sale terminal. Adapters are designed for mating with different ones of commercially available communicating devices (host) using the public switched network. The adapters are arranged to communicate with the host using the host protocol and with the processing device using the established, short range wireless protocol. In one embodiment, power is derived at the adapter using parasitic power from the communication link.

16 Claims, 3 Drawing Sheets

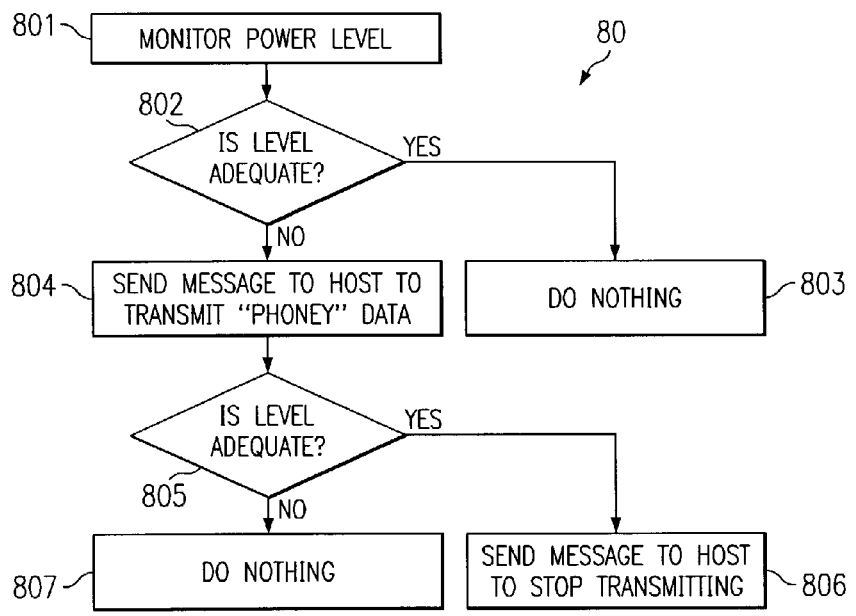
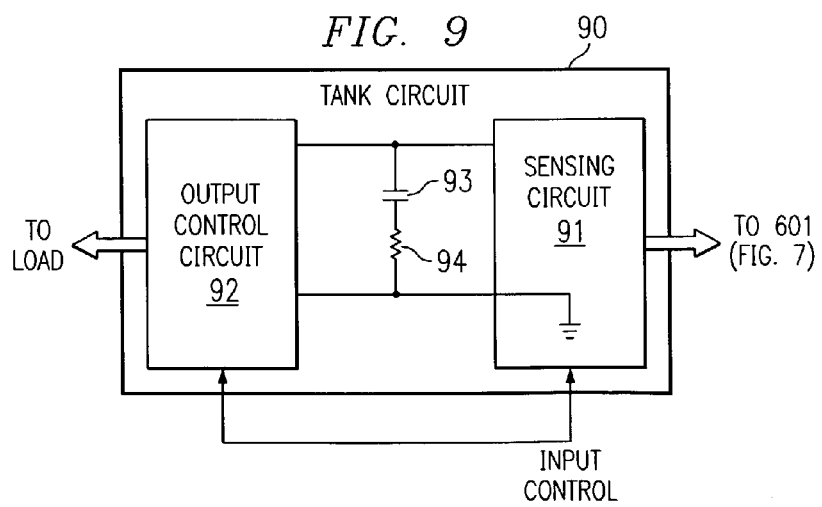

SHORT RANGE WIRELESS DEVICE INTERFACE WITH PARASITIC POWER SUPPLY

RELATED APPLICATIONS

The present application is related to commonly assigned and copending U.S. patent application Ser. No. 09/588,367 entitled "A SYSTEM AND METHOD FOR SECURE PROVISIONING AND CONFIGURATION OF A TRANSACTION PROCESSING DEVICE," filed Jun. 6, 2000; and U.S. patent application Ser. No. 09/588,453 entitled "SYSTEM AND METHOD FOR SECURE AUTHENTICATION OF A SUBSCRIBER OF NETWORK SERVICES," filed Jun. 6, 2000, the disclosures of which are hereby incorporated herein by reference.

TECHNICAL FIELD

This invention relates to wireless devices and specifically to a short range wireless system and method for interfacing between a public network host and a client device.

BACKGROUND OF THE INVENTION

Wireless data transmission devices are becoming very popular, particularly for point of sale transaction processing. Such devices are, in essence, the combination of a transaction processing (client) portion and a radio link (host) portion. Over a period of time, it is anticipated that the processing portion of each device will remain relatively stable while the radio portion will change as commercial standards change and as the technology accommodates faster and faster operation. Also, the design requirements for the processing portion are different and will mature and change at times different from the radio portion.

For example, when a wireless device is used for point of sale credit card, debit card or check processing, as shown in the above-identified copending U.S. patent application entitled "A SYSTEM AND METHOD FOR SECURE PROVISIONING AND CONFIGURATION OF A TRANSACTION PROCESSING DEVICE," and U.S. patent application entitled "SYSTEM AND METHOD FOR SECURE AUTHENTICATION OF A SUBSCRIBER OF NETWORK SERVICES," there is created a need to transmit the data from the processing terminal back to a central processing point. One solution is to build a radio device into the processing device and use one of the many wireless communication options available. However, to do this would require that the manufacturer of the point of sale processing equipment make a separate radio type for each of the possible wireless applications, (such as TDMA cellular, PCS, CDMA cellular, private bonds, public bonds other than cellular, etc.) which are available to merchants. That is an almost impossible task for a point of sale terminal manufacturer to achieve, as well as a very uneconomical solution.

A far better approach is to make the processing devices independent from the radio portion and then link the processing portion to a commercially available radio (cell phone, bluetooth modem, etc) so that the actual radio portion is carried by the mainstream (for the location of the point of sale terminal or other processing equipment) wireless carriers using widely available (thereby more economical) consumer devices. For example, the point of sale terminal could be connected to a cell phone and the data transmission can flow over the normal cellular system servicing the merchant's location.

FIG. 1 shows such an arrangement, and typically cell phone 12 is connected to point of sale terminal 11 by a cord (such as cord 101 in FIG. 1) or, in some instances, point of sale terminal 21 (FIG. 2) is constructed to hold a cellular telephone (such as cell phone 12) in a specially designed cradle. These system cause problems in that the cord is awkward and restrictive and the myriad of different telephones and wireless modems requires that the terminal manufacturer design its terminals to connect with, or to hold, different devices, each having a unique form factor and electrical connection protocol.

FIG. 3 shows another example of an attempt to solve this problem by using the wireless device's short range RF link, such as link 301 between the cell phone and terminal 31. While this works well, many of the same problems exist in that each wireless device uses different protocols thereby requiring different processing devices for each such protocol.

SUMMARY OF THE INVENTION

The present invention is directed to a system and method which attaches a short range communication device to the processing portion of the device using either an existing protocol or a unique protocol. Adapters are then used for fitting onto various commercial wireless transmitting devices as an interface between the commercial wireless device and the short range communication device. The adapters are designed to physically and electrically mate with the wireless communication device and serve to provide a short range communication link between the commercially available wireless communication device and the processor device using a short range communication system.

Adapter devices can be designed for various commercially available wireless devices which then can be substituted as the need arises, thereby allowing the processing device to remain unchanged regardless of the physical shape of the wireless device and regardless of the wireless protocol used to communicate with the public network.

The adapters can be designed such that power for the device can be derived from parasitic power obtained from the communication link of the wireless device or, alternatively, power can be obtained from a power link to the host device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 5 shows an alternative embodiment of the present invention where the processor has the short range communication link built in;

FIG. 8 shows a flow chart of one embodiment of parasitic power control; and

FIG. 9 shows one embodiment of a tank circuit for storing power.

DETAILED DESCRIPTION OF THE INVENTION

Figure 1:
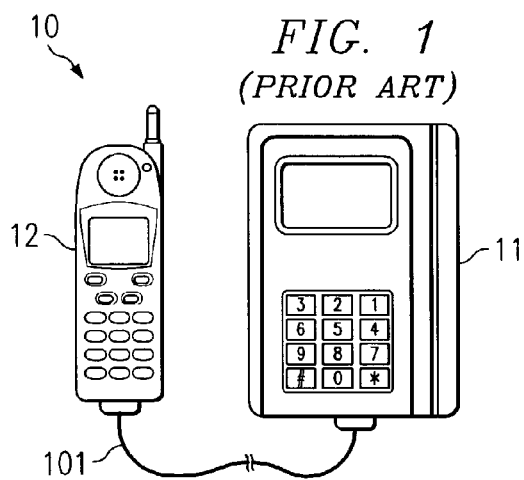
FIGS. 1–3 show prior art arrangements.
Figure 2:
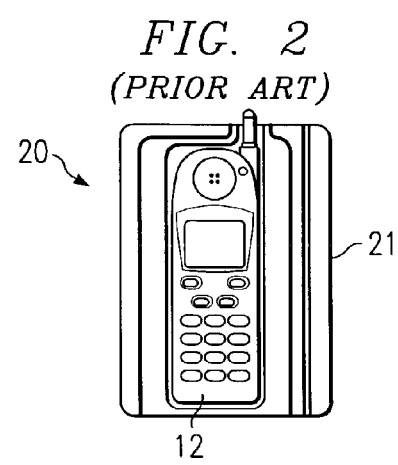
Figure 3:
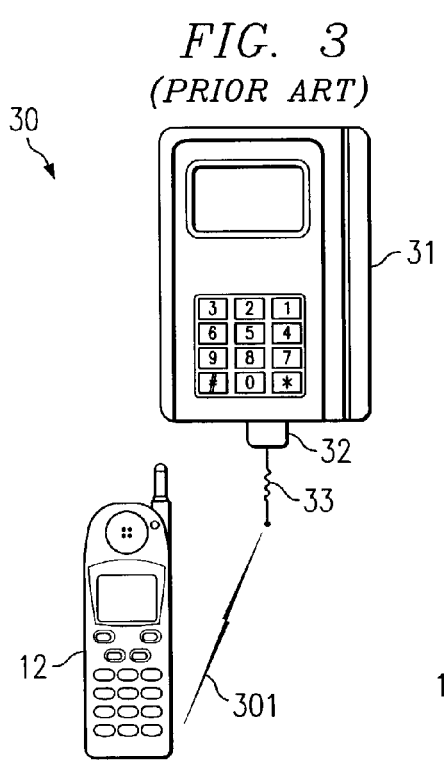
Figure 4A:
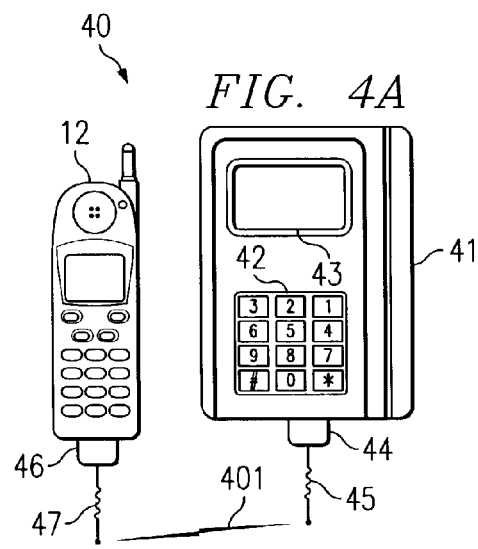
FIGS. 4A–4C show various embodiments of the present invention.

FIG. 4A shows system 40 in which cell phone 12 (host) and processor 41 (client) are in wireless communication over link 401. Link 401, in the embodiment shown, could, for example, be on a magnetic link or an infrared link and RF link terminates on one end in device 46 via antenna 47, which, as will be discussed, is designed to fit (physically and electrically) with cell phone 12 and terminates on the other end in device 44, via antenna 45.

Figure 4B:
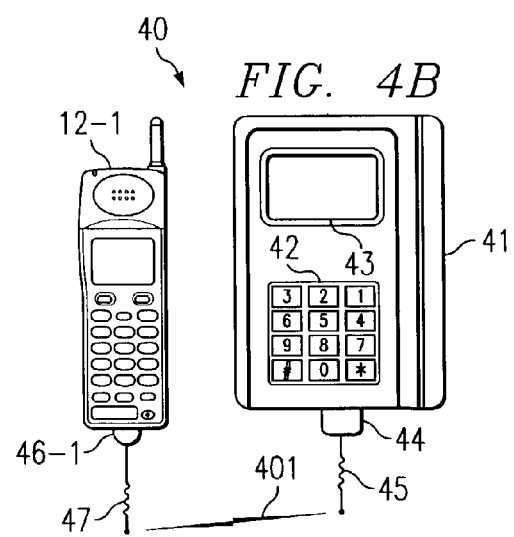
Figure 4C:
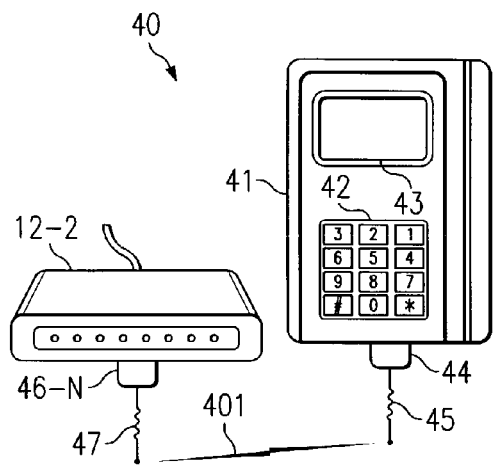
Figure 5:
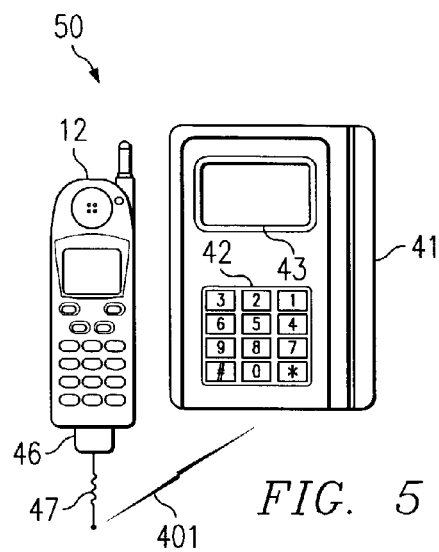

Device 44 includes antenna 45 shown hanging out, but the antenna (as well as the entire device) could be built in, as shown in FIG. 5. Similarly, antenna 47 of device 46 could be built-in to device 46. Device 46 serves to accept the protocol of link 401 (whichever protocol is selected) and convert that protocol to match the protocol of the interface port of host 12 (shown partially in FIGS. 6 and 7) to which it is attached. Protocol 401 advantageously operates in the IDM band (400 MHz) which is used for short distance industry/scientific purposes. There would be a different device 46 (such as devices 46-1 and 46N as shown in FIGS. 4B and 4C) for each different type of wireless host device. Thus, as shown in FIG. 4B, cell phone 12-1 is different from cell phone 12 (FIG. 4A) and modem 12-2 is different still from cell phones 12 and 12-1, but they all use protocol 401 so that processor 41 need not change regardless of differences in the wireless host.

Note that link 401 could be an RF link, magnetic frequency link, or even an infrared IF link. As discussed above, some short range links exist so this would be used where the host does not have an IF link or there the IF protocol of the host is different from that of the client. It is contemplated that both the physical structure of device 46 as well as the electrical protocol connection to host 12 would change depending on host 12. Thus, a supplier would keep a plurality of differently designed devices 46 available. Since device 46 has little, if any, active circuitry and acts primarily as a protocol converter, device 46 can be relatively inexpensive to build.

Note that if the wireless link from the cell phone to the cell base station uses radio frequency, then generally, the short range link will not use a wireless radio frequency protocol that interferes with the band that is used by the cell phone. If the cell phone is transmitting and communicating, for example, in the 800, 900, 1300, 1900 megahertz bands, generally it would not be wise to implement short range protocol 401 to use the same band for interference reasons. For example, in America if one were to use radio frequency (RF) for the short wireless link, which would typically be under 100 meters, one should use the IDM band (400 MHz band), which is a short range industrial and scientific band. Infrared would be a good choice also, as would be magnetic frequencies. There is a preference for using magnetic waves instead of radio waves because the power requirements are less. There would be a preference to using infrared instead of magnetic waves because the power requirements are minimal, but the problem with infrared is it is a line of sight protocol.

In FIG. 5 there is shown system 50 where, as discussed above, the client device has the short range link transmitter built in but still uses protocol 401. In either event, using the devices of FIGS. 4A–4C, or the device of FIG. 5, all one needs to do to make the processor wireless is to mount a proper device 46 on a nearby wireless host.

Figure 6:
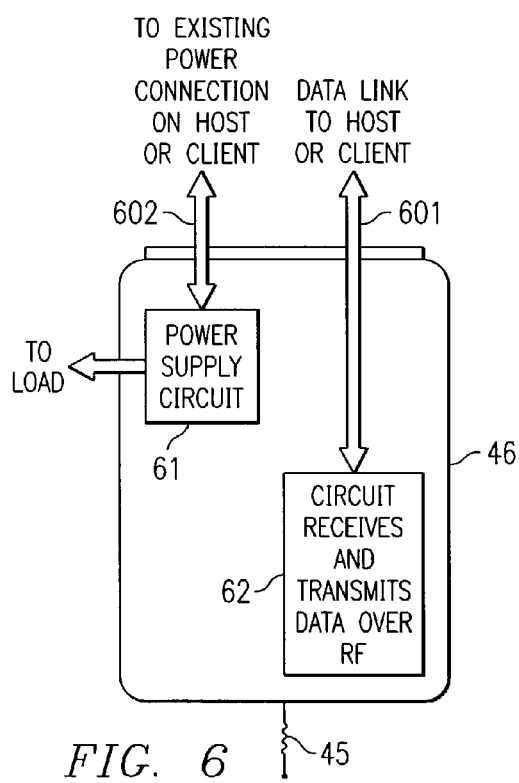
FIG. 6 shows the adapter receiving power from the host.

FIG. 6 illustrates an example where power is obtained from the host (not shown in FIG. 6) or, if desired, the client. This arrangement works in situations where the host has externally available power connections to supply power to attached devices. Note that power supply line 602 could be a general I/O line that comes out to the connector from the host that can be controlled by software in the host that either turns the connector device off or on automatically, or in a controlled manner. For example, say it is desired to provide a 3 volt supply to the device circuit. The I/O line on the host then can turn on the device and it will provide a 3 volt supply for a certain amount of time, after which if could shut off either automatically or manually.

Adapter device 44 would have terminal pins to mate with the power connections of the host. If such power is available, that would be the preferred way to obtain power which, if necessary, would be tailored for use by circuit 61 which could be any well-known power supply circuit.

A protocol could exist between a micro controller 62 that is in the device and the host. Such a micro controller may or may not be necessary, depending upon the application. What is necessary is a mechanism by which data coming to or from the host can be transmitted over short distance wireless link 401 without interference with the long distance wireless link from the host to the public network. The microprocessor can be used to accept the data from the client device and operate to control the host, for example, to lift it off the hook or to dial.

What is contemplated is connecting the device to a cell phone as host, and the cell phone may have an external connection where it can be connected to a device, such as a hands free cradle in a car. The inventive system would take advantage of that connection, but would add the control protocol for the short distance wireless link between the host adapter and the short range link controller in the device on the client. Such a controller is not shown, but would be similar to circuit 62.

It is contemplated that the cell phone (or other host device) would contain a microprocessor which runs certain software. That software is transmitting information to device 46 which may, or may not, have another microprocessor in it. The task is to package the data appropriately and control the wireless circuitry without directly involving the microprocessors that are in the cell phone. In this regard, control signals are passed back and forth between the host and its adapter device. Thus, the device must be tailored for the protocol of the host to which it is attached. This tailoring can be factory set or can be remotely programmed.

The adapter device, if desired, could include circuitry that involves encryption of the short range wireless link so that the link is not compromised by somebody inadvertently, or surreptitiously, sniffing that data. The device can also include state indication circuitry, such as LEDs.

The RF transceiver circuit has the capability or taking data and sending it (and the reverse) so the circuit requires intelligence to appropriately control the protocol over that data link. This control would include buffers or queues to hold data, and then send it out in a format.

In operation, the cell phone, or other host device, could be located in a clerk's pocket or under a counter, and the clerk on a per transaction basis would not be aware of the phone being controlled by the point of sale terminal, which, as discussed above, controls the cell phone's transmitting and receiving capability.

Figure 7:
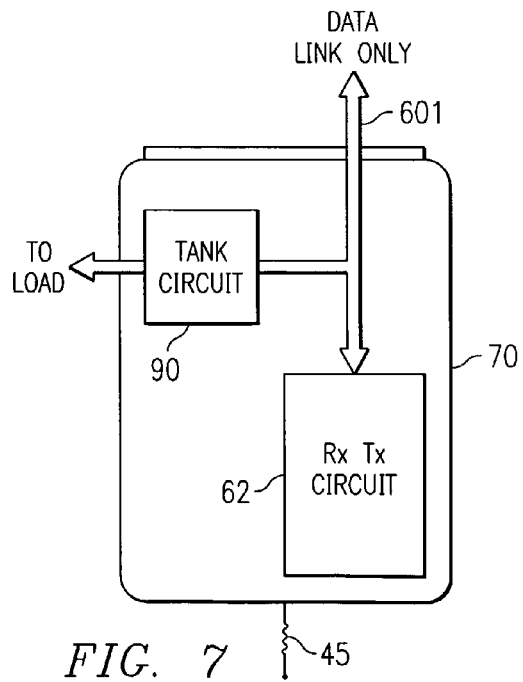
FIG. 7 shows one embodiment of the parasitic power arrangement of the present invention.

FIG. 7 shows adapter 70 which is used with host devices which do not have power supply (or I/O) lines 602 (FIG. 6) that are useable. Adapter 70 then would replace adapter 46, 46-1, 46-N. In the absence of power lines or general purpose I/O lines, the line that is available is communication bus 601, which includes a receive line and a transmit line (or a single line that can be used for bi-directional receive and transmit). In such situations, a parasitic circuit can be used which uses activity on the communication line to obtain power. One embodiment of such a circuit is shown in FIG. 9 and operates to change a capacitor, or other power storage device, in tank circuit 90 such that when the storage device reaches a certain level, power becomes available to supply the adapter. This allows the voltage fluctuations to be stored in the storage device. After the capacitor reaches the charge point, the circuit is powered and the adapter then uses the same communication line to communicate with the host drawing current from the charged capacitor in tank circuit 70.

The system could draw power from data communication during an actual transaction but it would be preferable to do so at times when the system is not otherwise communicating. In this regard, the host would transmit "phony" or extraneous data that is not going to be used in an actual transaction so as to charge the tank circuit using parasitic power. The extraneous data could be sent at times when transactional interchange is not occurring or could be part of a transactional exchange and could, if desired, be interspersed with the transactional data or could proceed (or follow) the transactional data. In this case, the host would be actively involved in the protocol on an ongoing bases and the host would operate to see that the parasitic power supply is charged up enough to receive information whenever it needs to. Communications adapter 46 is limited to times when client 41 requires confirmations of credit information. Thus, the sporadic nature of such communication allows time for parasitic charging using "phony" data. Circuit 62 could, if desired, be used to control the supply of "phony" data as shown in FIG. 8. In all other respects, the tail device of FIG. 7 is the some as in FIG. 6.

FIG. 8 shows system 80 which is one illustration of a control circuit located in adapter 46 and could be part of circuit 70 or circuit 62 or could be its own standalone microprocessor attached to BUS 601. Box 801 monitors the power level of tank circuit 70 either on a continuous basis or on a timed interval basis. If the power level is adequate, box 802 does nothing as show by box 803. If the power level is not adequate, the circuit then would send a message to the host to transmit "phony" or extraneous data (as discussed above) via box 804. At some period the power level would again be monitored and if the power level is adequate, box 805, a message would be sent via box 806 to the host to stop the transmitting of the extraneous data. Of course, if the power level is still not adequate nothing will be done and the host would continue to send the extraneous data. As discussed, this extraneous data could come during silent periods of the transactional data or intermingled with the transactional data. In some situations, tank circuit 70 would be charged from the actual transactional data.

FIG. 9 shows tank circuit 90 which obtains power from communication leads 601 when data (or other signals) are present on those leads. Sensing circuit 91 monitors lead 601 and when appropriate, either by measuring the power available on leads 601, or under control of an input signal (either internally or externally generated), opens a switch to allow the signal voltages on leads 601 to charge capacitor 93 which is shown, in one embodiment connected to resistor 94. Note that many different storage devices could be used, with or without capacitors and with or without resistors.

Usually, during charging, the output is open under control of output circuit 92. When it is desired to apply power to the adapter, control circuit 92, either by sending line voltage or under control of an input signal (either externally or internally generated), closes the circuit for a period of time thereby allowing power to flow to adapter 46-1 from the storage device.

The advantage of this approach is that it does not require an external power supply to power the circuit that is providing the wireless short link. That means that there is no need to string wires to a wall power supply, and it is not necessary to provide the adapter with power from a battery or any other unwieldy, bulky or costly power supply.

Using this invention, the client device does not need to be re-engineered every time the host devices change, or the industrial design changes or the form factor changes. At most, when a change is made to the commercial device, a fairly inexpensive adapter would be designed and the client would not be charged.

While the description focuses on cellular hosts, it should be understood that any type of communication device can be used as a host, including, for example, wireline and cordless phones, modems, computers connected to the internet or to other communication networks. Also, while point of sale terminals are discussed, any application which requires periodic, preferably short, communication sessions with a remote device would be appropriate. This device could be, for example, appliances, security systems, monitors, computer systems not having their own dedicated network communication connection, and the like.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. An adapter for use between a point of sale terminal and a commercial wireless device, said adapter comprising:
   a physical interface for mechanically connecting said adapter to at least one specific commercial wireless device;
   a short range wireless protocol module for receiving communication from said point of sale terminal;
   a circuit for sending control signals through said physical interface to control said wireless device in response to received ones of said short range wireless communications; and
   a circuit for receiving power from said commercial wireless device wherein said circuit stores power derived from data sent from said commercial wireless device.

2. The adapter of claim 1 wherein said short range wireless protocol module is selected from the group consisting of RF, IR and magnetic modules.

3. The adapter of claim 1 wherein said short range wireless communications are bi-directional between said adapter and said point of sale terminal.

4. The adapter of claim 1 wherein said data sent from said commercial wireless device is sent for the sole purpose of allowing said adapter to store said power.

5. The adapter of claim 1 wherein said stored power is parasitic power.

6. The adapter of claim 1 wherein said adapter is further arranged for temporary mating with said commercial wireless device.

7. The adapter of claim 1 wherein said commercial wireless device is selected from the group consisting of cellular telephones, wireless modems, computers having a network connection, wireless telephones, cordless telephones, pagers, and personal digital assistants.

8. A point of sale system comprising:
   a point of sale terminal;
   a short range wireless transceiver associated with said point of sale terminal;
   a cellular communication device; and
   an adapter for physically mating with said communication device and having a protocol module contained within said adapter for communicating both with said mated communication device and with said short range wireless transceiver associated with said point of sale terminal, wherein said adapter further comprises a circuit for receiving power from said cellular communication device, said circuit storing power derived from data sent from said cellular communication device, and said data sent from said cellular communication device is sent for the sole purpose of allowing said adapter to store said power.

9. The system of claim 8 wherein said short range wireless transceiver uses a protocol selected from the group consisting of RF, IR and magnetic, said protocol operative to avoid interference with the communications to/from said cellular communication devices.

10. The system of claim 8 wherein said short range wireless communications are bi-directional between said adapter and said point of sale terminal.

11. The system of claim 8 wherein said stored power is parasitic power.

12. The system of claim 8 wherein said adapter is further arranged for temporary mating with said cellular communicating device.

13. The method of clearing a credit transaction, said method comprising the steps of:
   accepting transaction information at a point of sale terminal;
   establishing a wireless communication connection between said point of sale terminal and a communicating device located remotely from said point of sale terminal, said wireless connection using a short range protocol different from the protocol used by said remotely located communicating device;
   accepting said short range wireless protocol at an adapter temporarily physically mated to said remotely located communicating device, said adapter serving to convert between said different protocols; and
   generating extraneous data at said remotely located communicating device, said extraneous data used for delivering power to said adapter.

14. The method of claim 13 wherein said extraneous data is generated under control of said adapter.

15. A system for clearing a credit transaction, said system comprising:
   means for accepting transaction information at a point of sale terminal;
   means for establishing a wireless communication connection between said point of sale terminal and a communicating device located remotely from said point of sale terminal, said wireless connection using a short range protocol different from the protocol used by said remotely located communicating device;
   means for accepting said short range wireless protocol at an adapter temporarily physically mated to said remotely located communicating device, said adapter serving to convert between said different protocols; and
   means for generating extraneous data at said remotely located communicating device, said extraneous data used for delivering power to said adapter.

16. The system of claim 15 wherein said extraneous data is generated under control of said adapter.

* * * * *